(12) United States Patent
Guttman et al.

(10) Patent No.: US 11,378,455 B2
(45) Date of Patent: Jul. 5, 2022

(54) CORRECTING REFLECTANCE OUTPUT VALUES

(71) Applicant: HP Indigo B.V., Amstelveen (NL)

(72) Inventors: Nir Guttman, Ness Ziona (IL); Ziv Berkovich, Ness Ziona (IL); Gil Arie Uner, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 482 days.

(21) Appl. No.: 16/334,495

(22) PCT Filed: Oct. 11, 2016

(86) PCT No.: PCT/EP2016/074348
§ 371 (c)(1),
(2) Date: Mar. 19, 2019

(87) PCT Pub. No.: WO2018/068834
PCT Pub. Date: Apr. 19, 2018

(65) Prior Publication Data
US 2021/0278278 A1 Sep. 9, 2021

(51) Int. Cl.
*G01J 3/46* (2006.01)
*G01J 3/28* (2006.01)
*G01J 3/50* (2006.01)

(52) U.S. Cl.
CPC ............ *G01J 3/462* (2013.01); *G01J 3/28* (2013.01); *G01J 3/50* (2013.01)

(58) Field of Classification Search
CPC ...... G01J 3/462; G01J 3/28; G01J 3/50; G01J 3/46
See application file for complete search history.

(56) References Cited

U.S. PATENT DOCUMENTS

| 4,866,644 A | 9/1989 | Shenk et al. |
| 6,351,308 B1 | 2/2002 | Mestha |
| (Continued) | | |

FOREIGN PATENT DOCUMENTS

EP    1726929    11/2006

OTHER PUBLICATIONS

Color Sentinel Systems: In-line and Handheld Modeling Spectrophotometer Overview < http://www.colorsentinelsystems.com/wp-content/uploads/2014/09/CSS-Brochure.pdf >.

*Primary Examiner* — Maurice C Smith
(74) *Attorney, Agent, or Firm* — Fabian VanCott

(57) ABSTRACT

In an example of the disclosure, a device (38) includes: an acquiring unit to obtain first reflectance output values acquired from reference samples (52) by a reference color measuring device and to obtain second reflectance output values acquired from the reference samples (52) by a second color measuring device (2); a processing unit to determine, for a plurality of wavelength values, correspondences between a first reflectance output value acquired by the reference color measuring device and a second reflectance output value acquired by the second color measuring device, and to perform, for each wavelength value, an interpolation based on the correspondences to obtain interpolation data; and a correcting unit to correct, based on the interpolation data, third reflectance output values acquired by the second color measuring device (2) from a sample of interest (12).

19 Claims, 6 Drawing Sheets

(56) References Cited

U.S. PATENT DOCUMENTS

| | | |
|---|---|---|
| 7,283,240 B2 | 10/2007 | Mestha et al. |
| 7,589,837 B2 | 9/2009 | Wang et al. |
| 2011/0282613 A1* | 11/2011 | Skinner .................. G01J 3/524 |
| | | 702/104 |

* cited by examiner

CORRECTING REFLECTANCE OUTPUT VALUES

BACKGROUND

A spectrophotometer is a device for measuring intensity of light as a function of its color (wavelength). Various designs of spectrophotometers have been developed over the years and spectrophotometers are nowadays used in many industries.

A spectrophotometer may illuminate a sample for measurement with a source light (e.g. white light). The sample absorbs some of the projected light and reflects back a portion thereof, the proportion of reflected light being dependent upon the sample properties (color etc.). The spectrophotometer is equipped with detectors for detecting the light reflected back by the sample. By means of the detectors, the spectrophotometer can split the detected light into separate wavelength intervals. Based on the reflected light intensity detected as a function of the light wavelength, it is possible to determine the reflectance of the sample. The reflectance, expressed as a fraction or as a percentage, corresponds to the fraction of light intensity reflected back by the sample. Based on the spectrophotometer output, spectral reflectance curves can be produced.

Among possible applications, spectrophotometers are used in the printing industry to monitor color of ink printed by printers, such as inkjet printers, on medium substrates. Spectrophotometers allow to ensure that the quality of a printing meets with particular standards.

DRAWINGS

For simplicity and clarity of illustration, the same reference numerals will be used throughout the figures to refer to the same or like parts, unless indicated otherwise.

Figure 1:
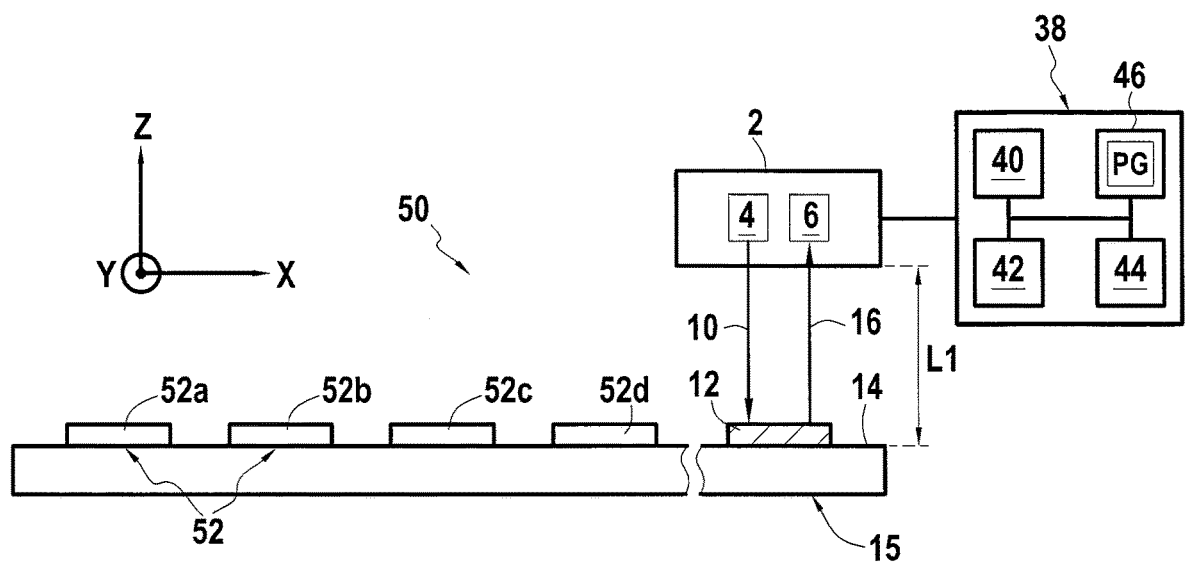
FIGS. 1, 2 and 3 are schematic views showing a system according to an example of the present disclosure.

The components in the figures are not necessarily to scale, emphasis instead being placed upon illustrating the principles of the described subject matter.

DESCRIPTION

While the present disclosure is susceptible of implementation in many different forms, there are shown in the drawings and will be described herein in detail specific examples thereto with the understanding that the present disclosure is to be considered as an exemplification of the principles of the disclosure and is not intended to limit the disclosure to the specific implementations illustrated.

Numerous details are set forth to provide an understanding of the implementations described herein. The examples herein may be practiced without these details. In other instances, well-known methods, procedures, and components have not been described in detail to avoid obscuring the implementations described.

To acquire reflectance output values from a sample using a spectrophotometer (or a color measuring device), the sample has to be positioned on a surface, called hereinafter "measuring surface". The spectrophotometer should be accurately positioned relative to the measuring surface when reflectance of the sample is acquired.

However, due to mechanical imperfections in the spectrophotometer assembly (manufacturing tolerances etc.), and because of changes in the positioning and structure of the spectrophotometer over time, misalignments of the spectrophotometer relative to the measuring surface may occur, thereby causing distortion to the spectrophotometer output measurements. Such misalignments may be referred to as "aberration".

To compensate for an aberration-induced error affecting output measurements of a spectrophotometer, the present disclosure provides a method to correct in an efficient manner reflectance measurements produced by color measuring devices such as spectrophotometers. The present disclosure also concerns a corresponding processing device to implement this method.

The disclosure allows correcting reflectance output values acquired by a color measuring device to compensate for an error induced by an aberration as discussed earlier.

In the present disclosure, examples of implementation are provided with respect to a spectrophotometer. It is understood that the disclosure applies generally to color measuring devices.

FIG. 1 shows the structure of a system 50 according to a particular example, this system 50 including a spectrophotometer 2, a processing device 38 and a measuring surface 14.

In this example, the spectrophotometer 2 includes an internal light source 4, such as a tungsten or LED lamp, and photodetectors 6. In use, the light source 4 may project light beams 10 on a sample 12 positioned on the measuring surface 14. The light source 4 may produce "white" light with a broad spectrum across the visible spectrum (i.e. from about 400 to 700 nm in wavelength). The light beams 16 reflected back by the sample 12 are detected by the photodetectors 6 of the spectrophotometer 2 for transmission to and later processing by the processing device 38. The photodetectors 6 may form a photodetector array positioned laterally relative to the light source 4.

The sample 12 may be ink printed on a medium substrate for instance or any other kind of object or element that needs to be analyzed. Based on the reflectance measurement output acquired by the spectrophotometer 2 from the sample 12, color of the sample 12 can be determined and monitored.

Aberration in the positioning of the spectrophotometer 2 relative to the measuring surface 14 may result from different types of misalignments.

As shown in FIG. 1, aberration may be caused by a change in the distance L1 between the light source 4 (or, more generally, the spectrophotometer 2) and the measuring surface 14. Aberration can also be caused by two types of rotation, namely a first rotation by a first rotation angle about the direction Y and a second rotation by a second rotation angle about the direction X. Other ways of defining an aberration affecting the reflectance output measurements of the spectrophotometer 2 are however possible.

The processing device 38 may cooperate with the spectrophotometer 2, for instance via a wire connection or a wireless connection of an appropriate type. More specifically, the processing device 38 may control operation of the spectrophotometer 2 and may acquire reflectance output values from any element, such as a sample 12, using the spectrophotometer 2. In a particular example, the processing device 38 (or any part of it) may be included within the spectrophotometer 2.

As later shown in FIG. 3, the processing device 2 may also receive reflectance output values acquired by another spectrophotometer 35, used as a reference spectrophotometer, from any element, such as reference samples 52.

In the present example, the processing unit 38 includes a processor (or controller) 40 and storing units 42, 44 and 46. The processing unit 38 may be a computer or a computing device of any appropriate form. The processing unit 38 may also include a communication interface (not shown) to communicate with the spectrophotometer 2.

The processor 40 may control the storing unit 42, 44 and 46 and any other components of the processing device 2. The processor 40 may operate to perform particular functions (acquisition, treatments . . . ), as is described later.

In use, the processing device 2 may command the spectrophotometer 2 to make reflectance output measurements from an element such as sample 12 as shown in FIG. 1. In response to an acquisition command from the processing device 2, the spectrophotometer 2 may acquire reflectance output values from the sample 12 based on the reflected light 16 detected by the photodetectors 6, and may transmit the obtained reflectance output values to the processing device 2. Based on the reflectance output values acquired by the processing device 38 using the spectrophotometer 2, appropriate processing can be performed by the processor 40 to analyze the color of the sample 12.

In the present example, the storing units 42, 44 and 46 are non-volatile memories.

Memory units 42 and 44 may be databases to store reflectance output values received by the processing device 38 from the spectrophotometer 2 or from another (external) spectrophotometer. In a particular example, the memory units 42 and 44 may be parts of a same memory structure.

In the present example, as shown in FIG. 1, the storing unit 42 is used to store first reflectance output values acquired from the reference samples 52 by the reference spectrophotometer 35 (FIG. 3) over a range of wavelength values.

Still in this example, as shown in FIG. 1, the storing unit 44 is used to store second reflectance output values acquired from the reference samples 52 by the spectrophotometer 2 over a range of wavelength values.

The memory unit 46 stores a computer program PG according to a particular example, this computer program PG including instructions for carrying out a method according to a particular example. Example implementations of this method will be described later. The memory 46 constitutes a non-transitory recording medium according to a particular example, readable by the processor 40.

The computer program PG can be expressed in any programming language, and can be in the form of source code, object code, or any intermediary code between source code and object code, such that in a partially-compiled form, for instance, or in any other appropriate form.

In addition, the non-transitory recording medium 46 can be any entity or device capable of storing the computer program PG. For example, the recording medium can comprise a storing means, such as a ROM memory (a CD-ROM or a ROM implemented in a microelectronic circuit), or a magnetic storing means such as a floppy disk or a hard disk for instance.

Moreover, the recording medium 46 can correspond to a transmittable medium, such as an electrical or an optical signal, which can be conveyed via an electric or an optic cable, or by radio or any other appropriate means. The computer program according to the disclosure can in particular be downloaded from the Internet or a network of the like.

Figure 4:
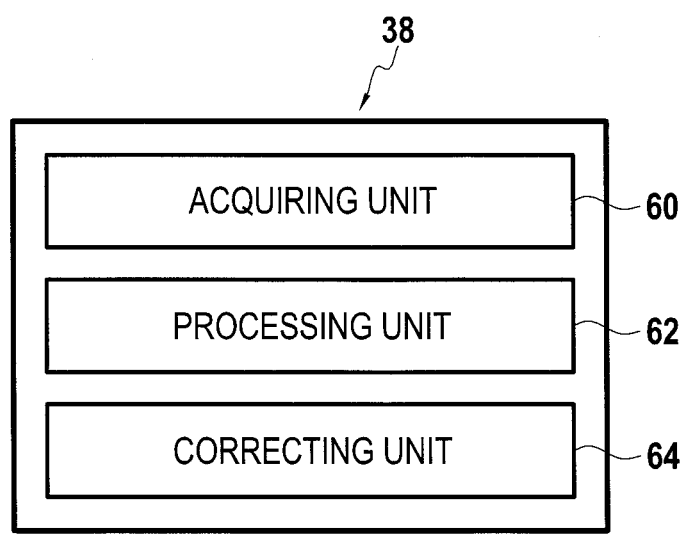
FIG. 4 is a block diagram showing a processing device according to an example of the present disclosure.

In the present example, when running the computer program PG, the processor 40 implements an acquiring unit 60, a processing unit 62 and a correcting unit 64, as depicted in FIG. 4.

Figure 2:
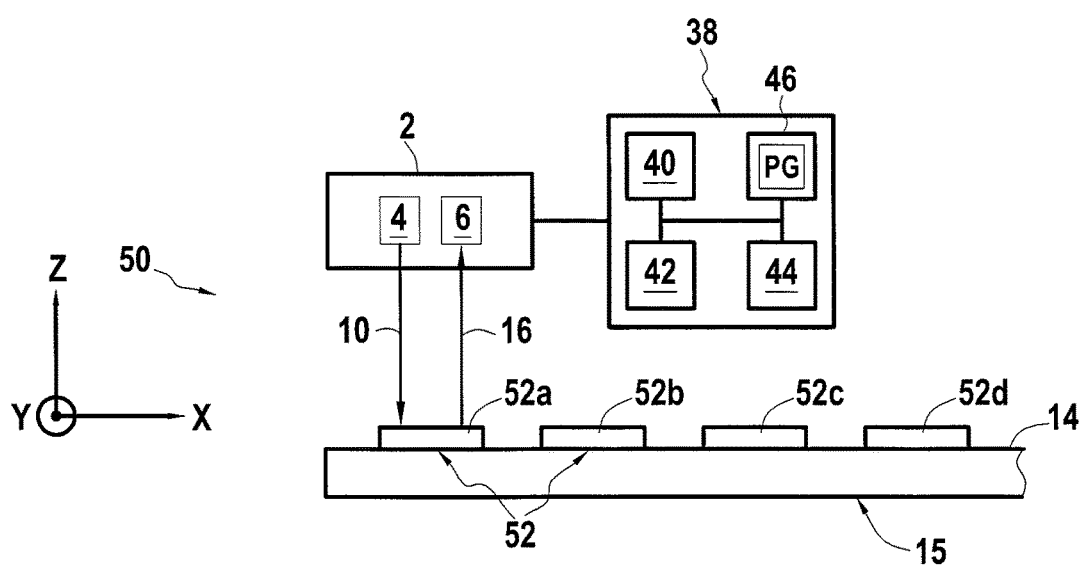
Figure 3:
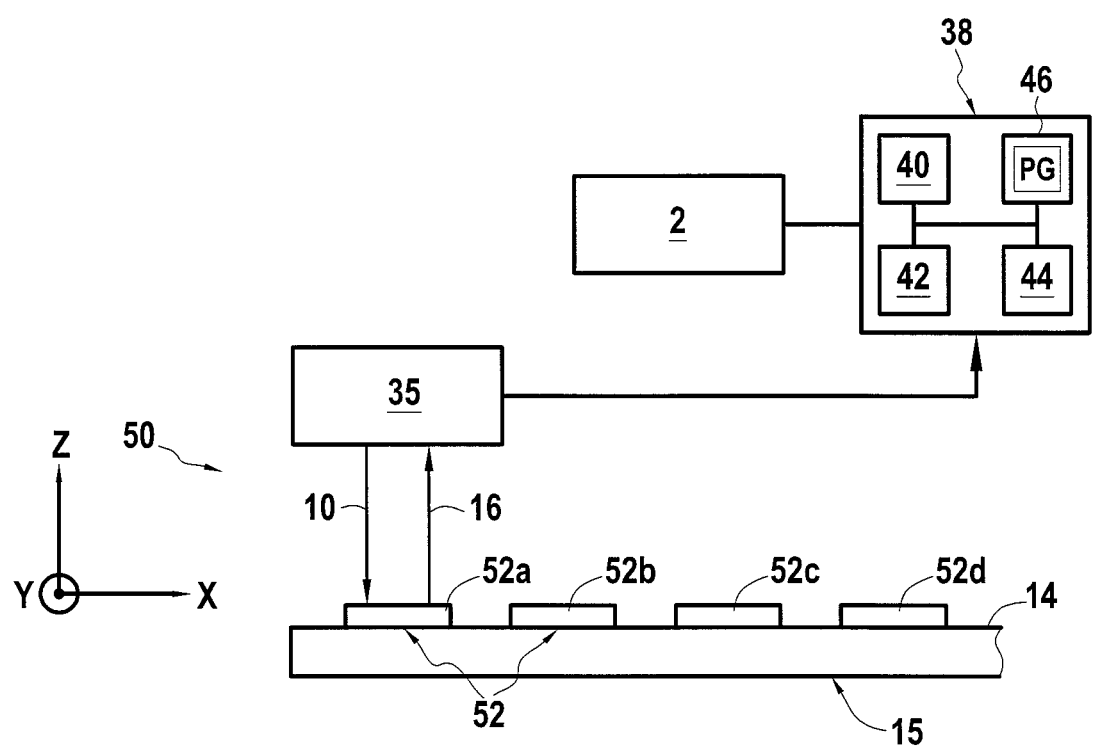

The acquiring unit 60 is to obtain (or detect) reflectance output values acquired from samples (e.g. reference samples 52 or sample 12 as shown in FIGS. 1-3) over a range RG1 of wavelength values. This wavelength range RG1 may be for instance 400-700 nm (nanometers). Other wavelength ranges are however possible.

As further described later, reflectance output values may be acquired by the acquiring unit 60 using the spectrophotometer 2 depicted in FIG. 1 or any other spectrophotometer, such as the spectrophotometer 35 shown in FIG. 3 which may be used as a reference spectrophotometer for the purpose of calibrating the spectrophotometer 2.

The processing unit 62 is to determine, for a plurality of wavelength values within the wavelength range RG1, correspondences between a first reflectance output value acquired by the reference spectrophotometer 35 and a second reflectance output value acquired by the spectrophotometer 2, and to perform, for each these wavelength values, an interpolation based on these correspondences to obtain interpolation data. Examples of implementation of such an interpolation will be described later below.

The correcting unit 64 is to correct, based on the interpolation data, reflectance output values acquired from a sample of interest by the spectrophotometer 2.

The modules 60, 62 and 64 constitute a non-limitative example of implementation of the present disclosure. The configuration of the modules 60, 62 and 64 is more apparent in view of the example implementations described below.

Referring back to FIG. 1, the system 5 includes a measuring surface 14 on which a sample of interest 12 may be positioned for the purpose of reflectance measurement by the spectrophotometer 2. As explained above, the spectrophotometer 2 may be misaligned with respect to the measuring surface 14, this resulting in distortion to the reflectance output measurements of the spectrophotometer 2.

In the present example, the measure surface 14 is formed by the upper surface of a support member 15 which may move laterally (in the x direction) relative to the spectrophotometer 2. As shown in FIG. 1, the sample of interest 12 may thus be accurately positioned in the area of impact of the light beam 10 emitted by the spectrophotometer. Lateral displacements of the support member 15 relative to the spectrophotometer 2 may be performed by any appropriate driving mechanism and, in a particular example, may be controlled by the processing device 38.

In the present example, the support element 15 includes the reference samples 52, 52b, 52c and 52d (collectively referred to as 52) positioned thereon. The reference samples 52 may take the form of calibration tiles or any other appropriate forms. Other example implementations with 2, 3 or more than 4 reference samples are also possible. As described below, the reference samples 52 may be used by the system 50, and more particularly by the processing device 38, to calibrate the spectrophotometer 2, so that an aberration-induced error affecting the reflectance measurements of the spectrophotometer 2 can be corrected.

As shown in FIG. 2, the support member 15 may be moved laterally (in x direction) relative to the spectrophotometer 2 to allow the latter to perform reflectance measurements on any of the reference samples 52 positioned on the measuring surface 14. Such relative displacements of the support member 15 in the x direction may be performed under control of the processing device 38. As described below, reference samples 52 of particular colours (some white, others dark . . . ) may be selected to improve efficiency of the method of the present disclosure.

As shown in FIG. 3, the reference spectrophotometer 35 may also be positioned relative to the measuring surface 14 to allow reflectance measurements on the reference samples 52. As the reference spectrophotometer 35 may operate in the same manner as the spectrophotometer 2 to perform reflectance measurements on a sample, the operation of the reference spectrophotometer 35 is not described in detail in the present disclosure. In a particular example, the reference spectrophotometer 35 is a handheld device so that it can be easily positioned opposite to each of the reference samples 52.

A method according to a particular example of the present disclosure is now described with reference to FIGS. 1-7 along with the flow diagram depicted in FIG. 8. The processing device 38 depicted in FIGS. 1-3 cooperates with the other components of system 50 to implement the method of FIG. 8.

It is assumed that one wishes to perform accurate reflectance measurements on a sample of interest 12 using the spectrophotometer 2. To compensate for an aberration-induced error that may affect the reflectance measurements of the spectrophotometer 2, a method according to the present example is carried out.

In S2, the processing device 38 obtains (or receives) first reflectance output values V1 acquired by the reference spectrophotometer 35, used as a reference spectrophotometer, from at least two reference samples 52 (i.e. from the 4 reference samples 52a-52d in the present case) over the range RG1 of wavelength values. In other words, the processing device 38 acquires the reflectance output values V1 using the reference spectrophotometer 35, the reflectance output values V1 being representative of the reflectance of the reference samples 52 over the wavelength range RG1.

In the present example, the wavelength range RG1 is the range 400-700 nm. It should be noted, however, that other wavelength ranges are possible.

More particularly, in S2 of the present example as shown in FIG. 3, the reference spectrophotometer 35 is positioned relative to the measuring surface 14 to perform successively reflectance measurements for each of reference samples 52 over the wavelength range RG1. The reflectance measurements may be performed at any appropriate wavelength interval between 400 nm and 700 nm. In this example, the reference spectrophotometer 35 performs reflectance measurement at the wavelength values of 400 nm, 410 nm, 420 nm etc. up to 700 nm (10 nm step). Accordingly, the first reflectance output values V1 are composed in this example of 31 reflectance output values as a function of wavelength over the range RG1=400-700 nm. The reference spectrophotometer 35 then transmits the acquired first reflectance output values V1 to the processing device 38, which receives the reflectance data V1 in S2. Transmission of the reflectance output values V1 from the reference spectrophotometer 35 to the processing device 38 may be achieved by any appropriate manner.

Figure 5:
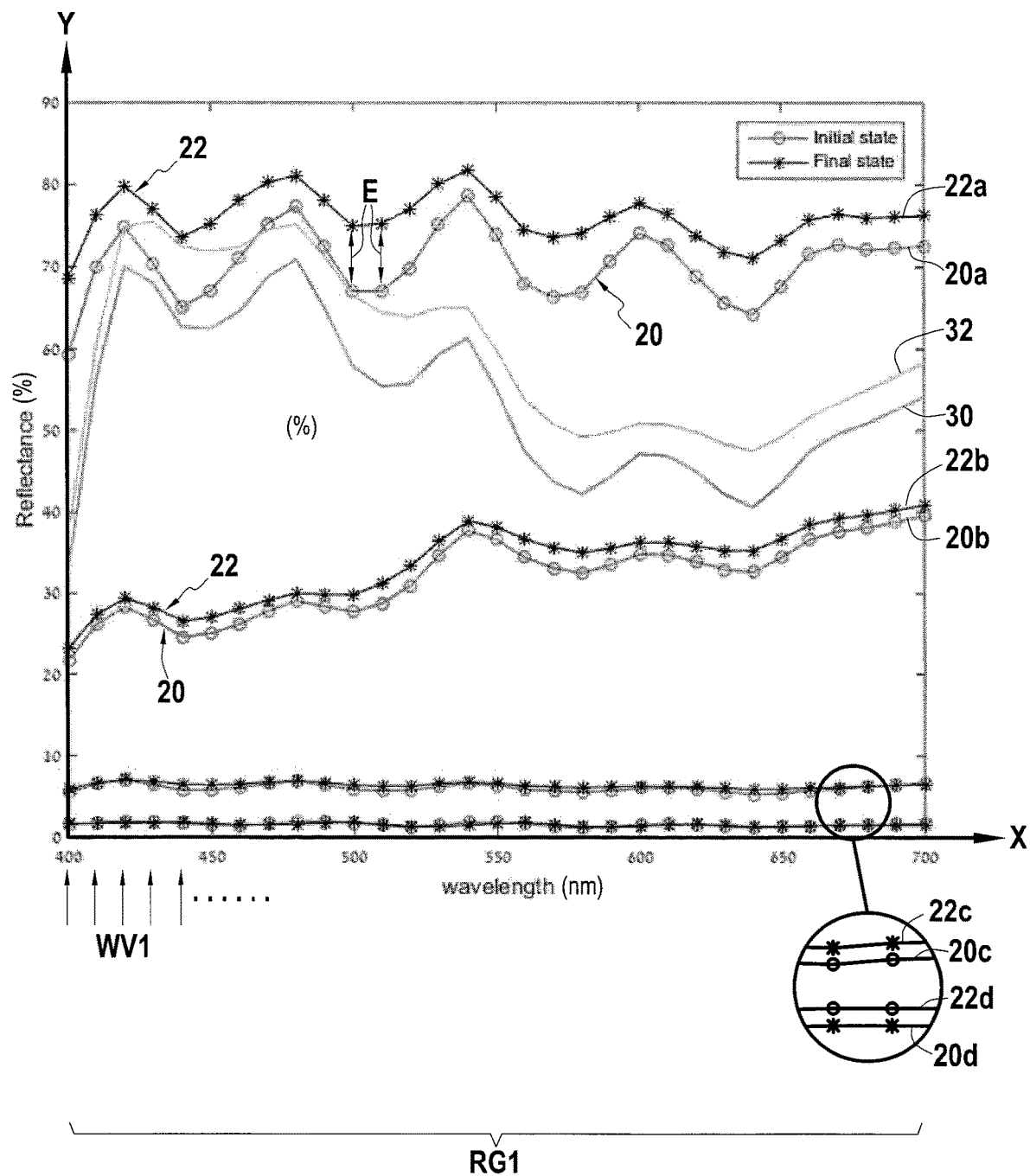
FIG. 5 is a diagram representing plots of calibration measurements according to an example of the present disclosure.

Based on the spectrophotometer output values V1 received in S2, the processing device 38 may produce spectral reflectance curves 20a, 20b, 20c and 20d (collectively referred to as 20) as shown in FIG. 5. Each of the curves 20 is obtained based on the reflectance output values V1 of a corresponding reference sample 52.

In a particular example, the processing device 38 stores the reflectance output values V1 in the database 42.

In S4, the processing device 38 obtains (or receives) second reflectance output values V2 acquired by the spectrophotometer 2 from the reference samples 52a-52d over the range RG1 of wavelength values. In other words, the processing device 38 acquires the reflectance output values V2 using the spectrophotometer 2, the reflectance output values V2 being representative of the reflectance of the reference samples 52 over the wavelength range RG1.

More particularly, in S4 of the present example as shown in FIG. 2, the spectrophotometer 2 is positioned relative to the measuring surface 14 to perform successively reflectance measurements for each of reference samples 52 over the wavelength range RG1. The processing device 38 may command successive lateral displacements of the support member 15 relative to the spectrophotometer 2 to allow the reflectance measurements on the reference samples 52 to be performed. In this example, reflectance measurement is performed by the spectrophotometer 2 at the same wavelength values as the reference spectrophotometer 35 in S2 (i.e. 400 nm, 410 nm, 420 nm etc. up to 700 nm). Accordingly, the second reflectance output values V2 are composed in this example of 31 reflectance output values as a function of wavelength over the range RG1=400-700 nm. The spectrophotometer 2 then transmits the acquired second reflectance output values V2 to the processing device 38, which receives the reflectance data V2 in S2. As for S2, transmission of the second reflectance output values V2 from the spectrophotometer 2 to the processing device 38 may be achieved by any appropriate manner.

Based on the second reflectance output values V2 received in S4, the processing device 38 may produce spectral reflectance curves 22a, 22b, 22c and 22d (collectively referred to as 22) as shown in FIG. 5. Each of the curves 22 is obtained based on the reflectance output values V2 of a corresponding reference sample 52.

In a particular example, the processing device 38 stores the second reflectance output values V2 in the database 44.

Figure 8:
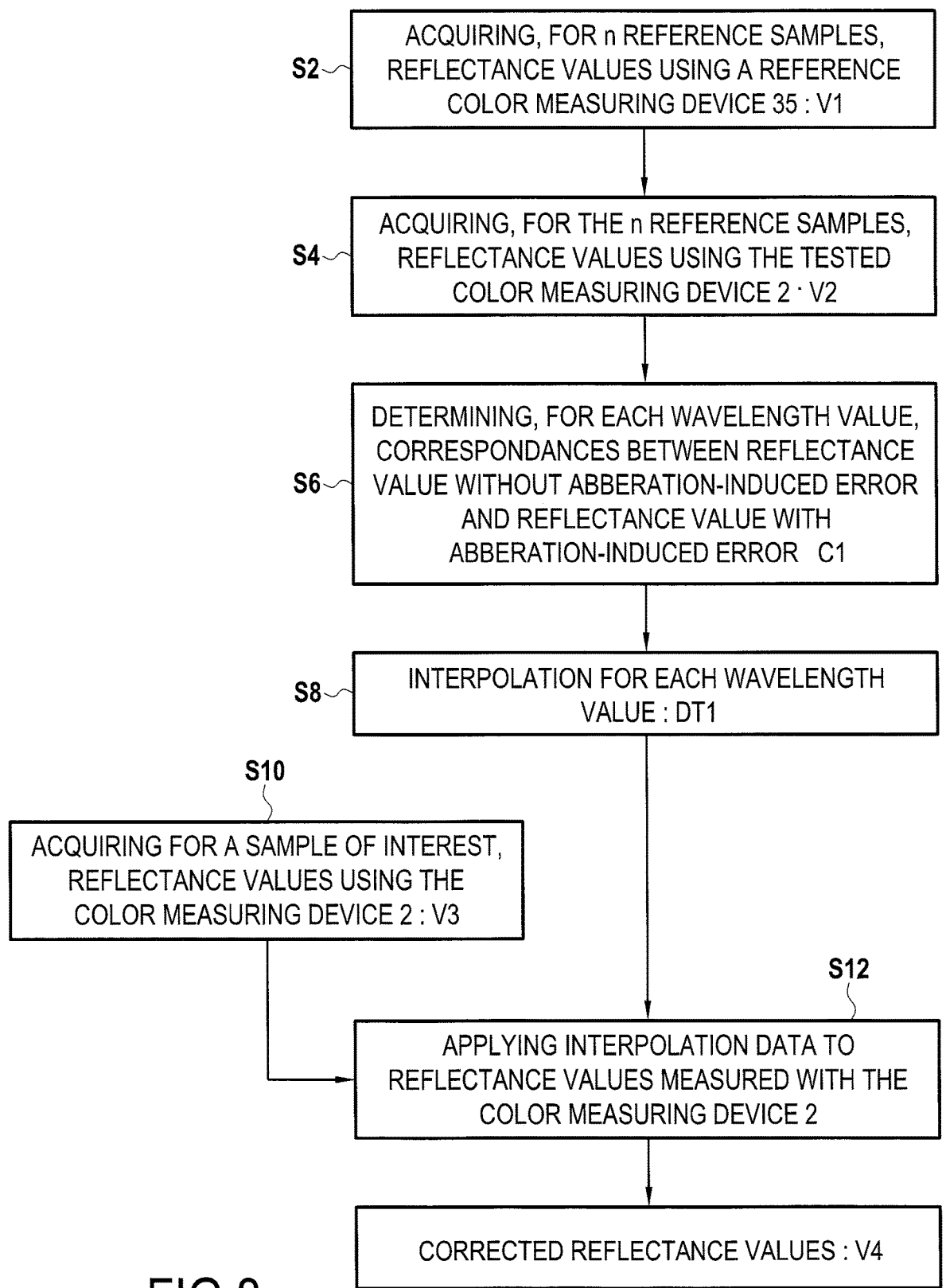
FIG. 8 illustrates a flow chart of an example of a method of the present disclosure.

In the present example, the first reflectance output values V1 are received (S2) by the processing device 38 before receiving (S4) the second reflectance output values V2, as shown in FIG. 8. S4 may however occur before S2 in another example implementation.

As can be seen in FIG. 5, for each reference sample 52, there is an error E (expressed in %) between the reflectance output values V1 acquired by the reference spectrophotometer 35 and the reflectance output values V2 acquired by the spectrophotometer 2, over the wavelength range RG1. This error E, which may vary as a function of wavelength, results from an aberration in the placement of the spectrophotometer 2 relative to the measuring surface 14.

The first and second reflectance output values V1, V2 constitute calibration data that can be used (as described below) to calibrate the reflectance measurements of the spectrophotometer 2.

In S6, the processing device 38 determines, for a plurality of discrete wavelength values WV1 within the wavelength range RG1, correspondences (noted C1) between the first reflectance output values V1 acquired by the reference spectrophotometer 35 and the second reflectance output value V2 acquired by the spectrophotometer 2. As a result, the processing device 38 obtains, independently for each wavelength value WV1, pairs of a first reflectance output value V1 and the corresponding second reflectance output value V2.

More particularly, in the present example as shown in FIGS. 6A-6D, the processing device determines in S6, independently for each wavelength value WV1 (i.e. 400 nm, 410 nm, 420 nm, 430 nm etc. up to 700 nm) within the wavelength range RG1, the correspondences C1 between the second output values V2 (x axis) obtained in S4 and the first reflectance output values V1 (y axis) obtained in S2. For a matter of simplicity, only the correspondences C1 for the wavelength values WV1=400 nm, 410 nm, 420 and 430 nm are illustrated in FIGS. 6A-6D, respectively. In FIGS. 6A-6D, the x axis represents the second reflectance output values V2 (with aberration) acquired by the spectrophotometer 2 in S4 and the y axis represents the first reflectance output values V1 (without aberration) acquired by the reference spectrophotometer 35 in S2. As a result, the processing device 38 obtains, for each discrete wavelength value WV1 within the range RG1, 4 pairs of a first reflectance output value V1 and a corresponding second reflectance output value V2. Each of these pairs is represented by a point 25 in FIGS. 6A-6D.

In S8, the processing device 38 performs, for each discrete wavelength value WV1, an interpolation based on the correspondences C1 determined in S6, to obtain interpolation data DT1.

Figure 6A:
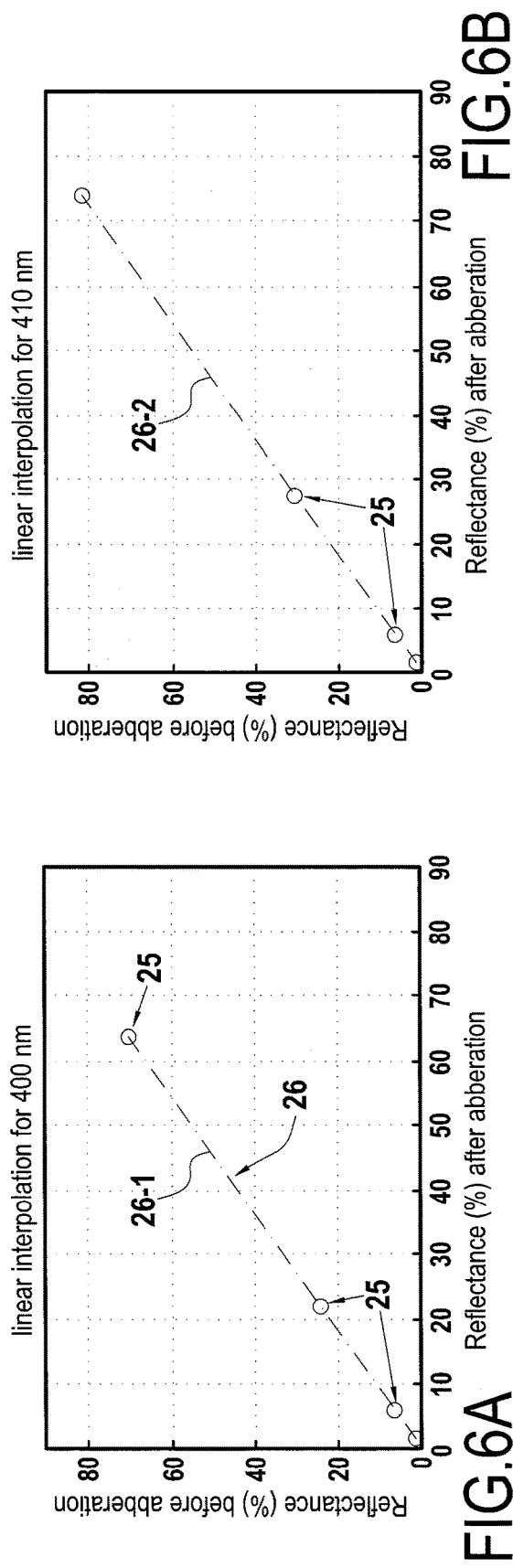
FIGS. 6A to 6D is a diagram representing correspondences between first and second reflectance output values, and interpolations performed based on these reflectance output values, according to an example of the present disclosure.
Figure 6B:
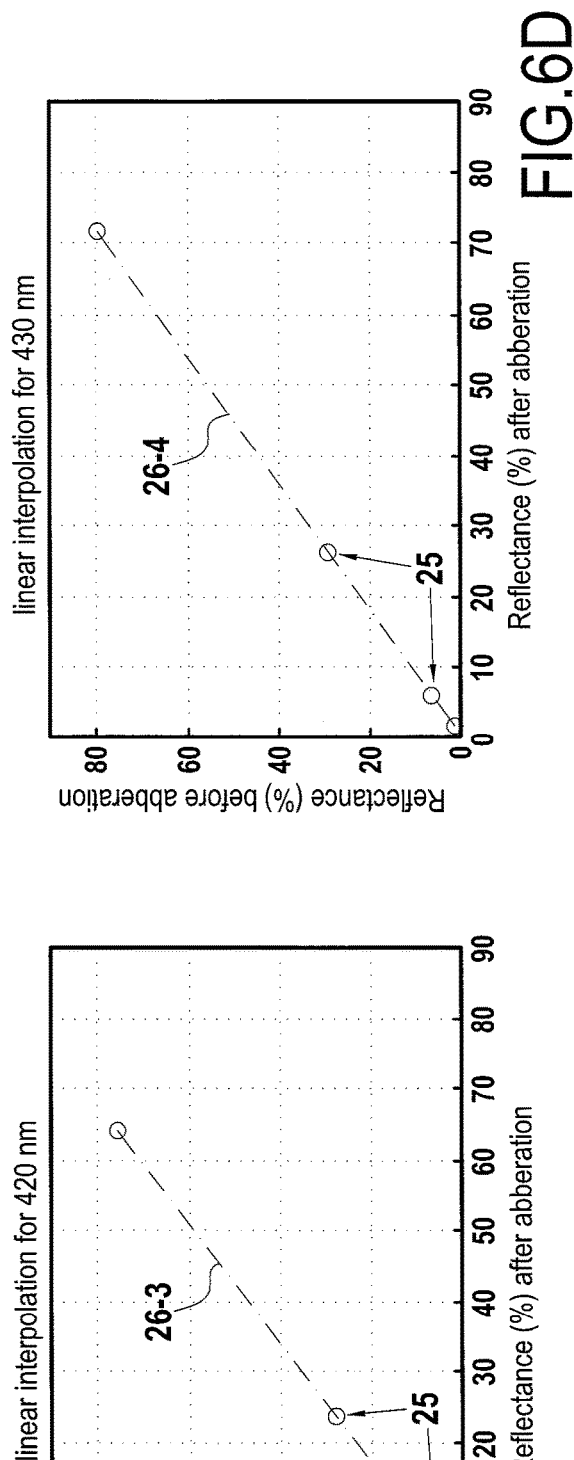
Figure 6C:
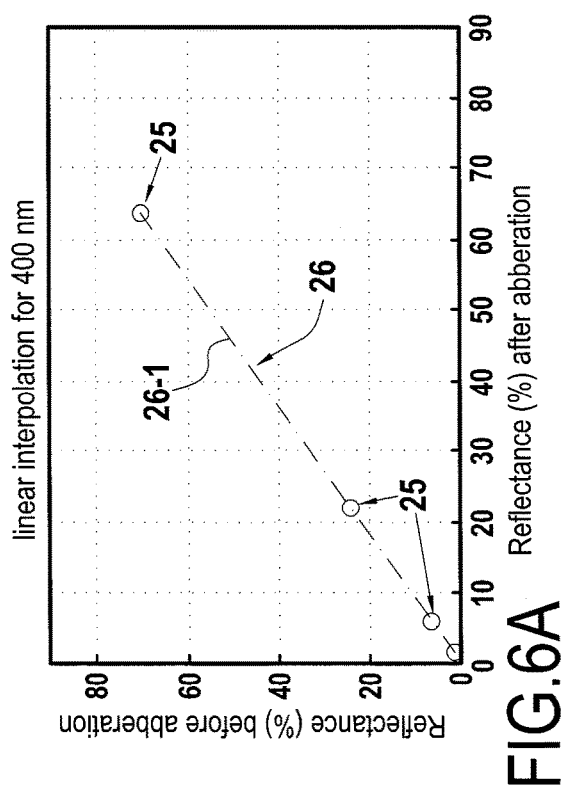
Figure 6D:
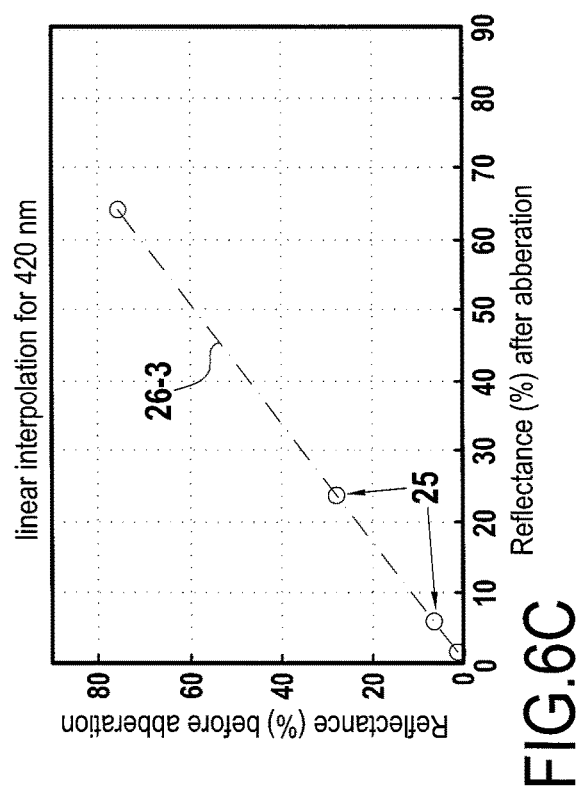

More particularly, in the present example as shown in FIG. 6A-6C, the processing device performs (S8), independently for each wavelength value WV1 (i.e. 400 nm, 410 n, 420 nm, 430 nm etc. up to 700 nm) within the wavelength range RG1, an interpolation based on the 4 pairs of first and second reflectance output values V1, V2 corresponding to the 4 points 25.

In the present example, the interpolation performed in S6 as shown in FIGS. 6A-6D is a linear interpolation, although other types of interpolation, such as a spline interpolation, are possible.

The interpolation data DT1 obtained in S8 includes a plurality of separate sets of interpolation data corresponding to each discrete wavelength value WV1 processed within the range RG1.

As shown in FIGS. 6A-6D, based on the interpolation data DT1, the processing device 38 may produce interpolation curves 26-1, 26-2, 26-3, 26-4 etc. (referred to collectively as 26) corresponding respectively to each discrete wavelength value WV1 (i.e. 400 nm, 410 nm, 420 nm, 430 nm etc. up to 700 nm).

Performing the interpolation in S8 allows to estimate, independently for each discrete wavelength value WV1 within the range RG1, correspondences between a reflectance output value acquired by the spectrophotometer 2 (including an aberration-induced error E) and a reflectance output value acquired by the reference spectrophotometer 35 (theoretically, without aberration-induced error), and this for any sample of interest. In other words, based on the interpolation data DT1, it is possible to determine, independently for each discrete wavelength value WV1, an estimated first reflectance output value V1 (without aberration-induced error E) corresponding to a second reflectance output value V2 acquired by the spectrophotometer 2 from a sample of interest.

By performing as many acquisitions as possible in S2 and S4, and performing interpolations based on the correspondences [V1, V2] determined in S6, the aberration profile (or behavior) of the spectrophotometer 2 as a function of wavelength can be accurately estimated. Ideally, the number of discrete wavelength values WV1 processed within the range RG1 is sufficiently large in S8 to obtain a continuous (or near continuous) estimation of the aberration profile of the spectrophotometer 2 over the entire wavelength range RG1.

In S10, it is now assumed that the processing device 38 obtains (or receives) third reflectance output values V3 acquired by the spectrophotometer 2 from a sample of interest 12 over the wavelength range RG1. In other words, the processing device 38 acquires the reflectance output values V3 using the spectrophotometer 2, the reflectance output values V3 being representative of the reflectance of the sample of interest 12 over the wavelength range RG1.

More particularly, in the present example as shown in FIG. 1, the spectrophotometer 2 in S10 is positioned relative to the measuring surface 14 to perform reflectance measurements from the sample of interest 12 over the wavelength range RG1. In the present example, the spectrophotometer 2 acquires a third reflectance output value V3 from the sample of interest 12 for each wavelength value WV1 (i.e. 400 nm, 410 nm, 420 nm, 430 nm etc. up to 700 nm). As already indicated, the processing device 38 may control the positioning of the spectrophotometer 2 relative to the support member 15 to allow the reflectance measurements on the sample of interest 12 to be performed. Accordingly, the third reflectance output values V3 are composed in this example of 31 reflectance output values as a function of wavelength over the range RG1=400-700 nm. The spectrophotometer 2 then transmits the acquired third reflectance output values V3 to the processing device 38, which receives the reflectance data V3 in S10. As for S4, transmission of the reflectance output values V3 from the spectrophotometer 2 to the processing device 38 may be achieved by any appropriate manner.

Figure 7:
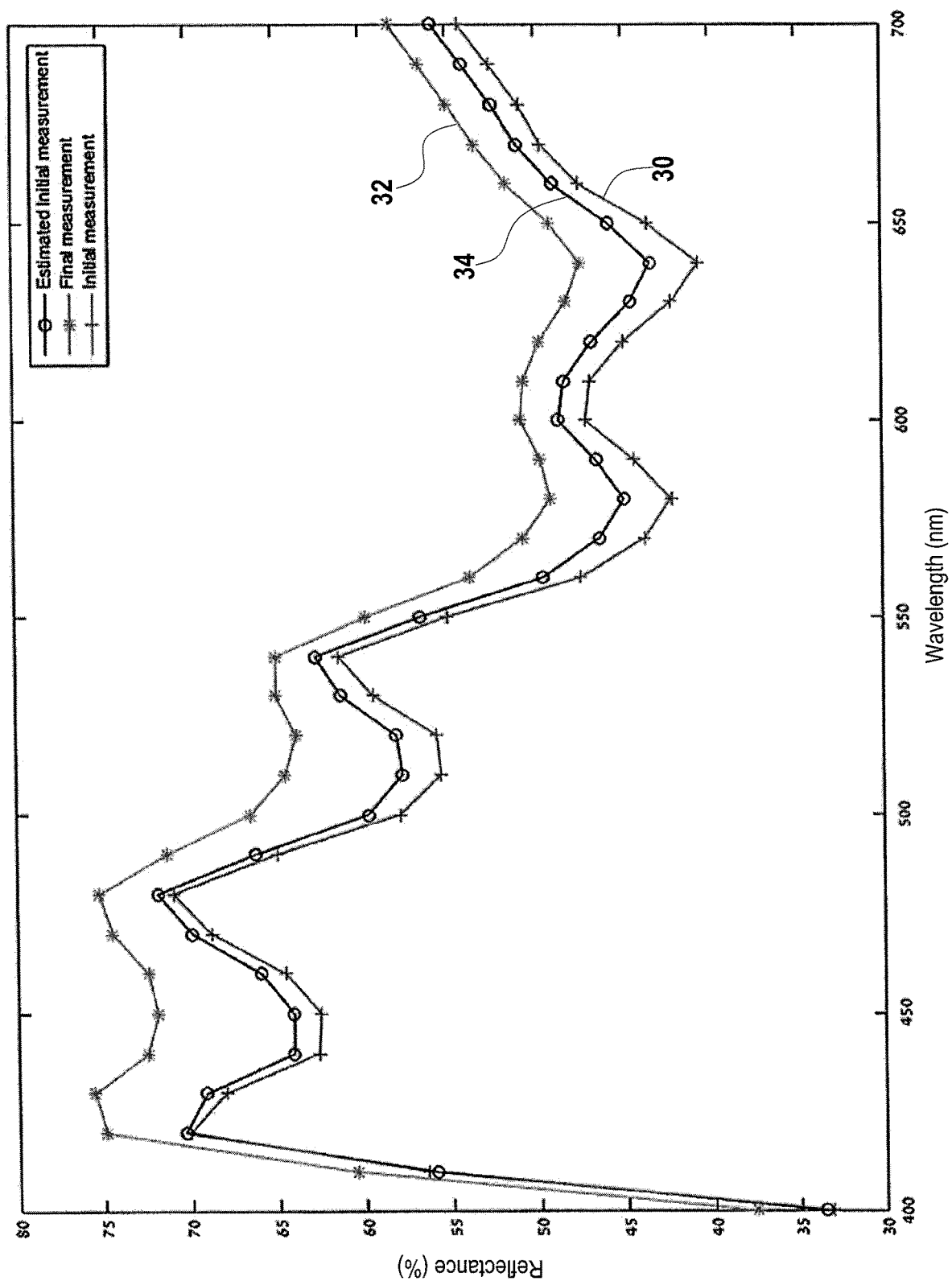
FIG. 7 is a diagram representing plots of reflectance measurements with and without correction, according to an example of the present disclosure.

Based on the third reflectance output values V3 obtained in S10, the processing device 38 may produce a spectral reflectance curve 32 as shown in FIGS. 5 and 7, this curve 32 representing the reflectance acquired by the spectrophotometer 2 from the sample of interest 12 as a function of wavelength within the range RG1.

In a particular example, the processing device 38 may temporarily store the third reflectance output values V3 in a memory (not shown) of the processing device 38.

In the present example, the third reflectance output values V3 are received (S10) by the processing device 38 after S2-S8, as shown in FIG. 8. In other example, the third reflectance output values V3 may be acquired and stored before any of S2 to S8, for later retrieval and processing in S12 as described below.

In S12, the processing device 38 corrects the third reflectance output values V3 obtained in S10 based on the interpolation data obtained in S8. As a result, the processing device obtains corrected reflectance output values V4 over the wavelength range RG1.

More particularly, in the present example as shown in FIGS. 5 and 7, the processing device determines in S12, independently for each discrete wavelength value WV1 (i.e. 400 nm, 410 nm, 420 nm, 430 nm etc. up to 700 nm) within the range RG1, an estimated aberration-free reflectance output value V4 corresponding to the third reflectance output value V3 acquired by the spectrophotometer 2 in S10, based on the interpolation data (or curves) 26 shown in FIGS. 6A-6D. By applying the interpolation data to the reflectance values V3 independently for each wavelength value WV1, the processing device 38 can correct the third reflectance output values V3 over the wavelength range RG1 to compensate for the aberration affecting the spectrophotometer 2.

In a particular example, the correction operation performed by the processing device 38 in S12 includes: estimating, based on the interpolation data DT1, an error E induced by the spectrophotometer 2 while acquiring the third reflectance output values V3 in S10, and correcting the third reflectance output values V3 to compensate for the estimated error E.

In FIG. 7, the curve 34 represents the corrected reflectance output values V4 estimated by the processing device 38 in S12. For illustrative purpose, FIG. 7 also shows the curve 30 which represents the reflectance output values acquired by the reference spectrophotometer 35 from the sample of interest 12. It can be seen that the corrected reflectance output values V4 (curve 34) constitutes an accurate estimation of the spectral reflectance of the sample of interest 12 without aberration.

In a particular example, the processing device 38 performs a method including: detecting first reflectance output values V1 acquired from the reference samples 52 over the wavelength range RG1 using the reference spectrophotometer 35; detecting second reflectance output values V2 acquired from the reference samples 52 over the wavelength range RG1 using the spectrophotometer 2; determining, for a plurality of wavelength values WV1 within the wavelength range RG1, correspondences between a first reflectance output value acquired by the reference spectrophotometer and a second reflectance output value acquired by the spectrophotometer 2; performing, for each of the wavelength values WV1, an interpolation of the determined correspondences, to obtain interpolation data representative of correspondences between a reflectance output using the reference spectrophotometer and a reflectance output using the spectrophotometer 2 over the wavelength range; detecting, from a sample of interest, third reflectance output values V3 over the wavelength range RG1 using the spectrophotometer 2; and applying the interpolation data to the third reflectance output values V3 to correct an error induced by the spectrophotometer 2 while acquiring the third reflectance output values V3.

The present disclosure allows to correct the aberration-induced error that may affect the reflectance measurements performed by a spectrophotometer from any sample of interest, this correction being based on calibration reflectance measurements performed on reference samples by the spectrophotometer at hand and by another spectrophotometer used as a reference spectrophotometer. Errors caused by misalignments and imperfect assembly of the measurement system can thus be corrected. This makes the measuring system more robust to changes over time, such as hardware part replacement for instance. Efficient correction can be achieved to compensate for an aberration even though the root cause of the aberration is not well understood.

To obtain satisfactory results, it is desirable that the interpolation performed in S8 is as accurate as possible, i.e. represents in an accurate and reliable manner the aberration-induced error affecting the spectrophotometer over the entire wavelength range RG1. In particular, it is desirable that the interpolation S8 be performed based on as many points 25 (as shown in FIGS. 6A-6B) as possible.

In a particular example, the first reflectance output values V1 acquired by the reference spectrophotometer 35 in S2 include: a first set of first reflectance output values V1 acquired from a first reference sample 52, and a second set of first reflectance output values V1 acquired from a second reference sample 52 (distinct from the first reference sample 52), wherein the first set of first reflectance output values V1 is above 70% reflectance over the wavelength range RG1, or above 80%, or above 90%, and wherein the second set of second reflectance output values V1 is below 10% reflectance over the wavelength range RG1, or below 5%, or below 2%. By calibrating the spectrophotometer 2 using a "white" reference sample 52 (i.e. with a high reflectance) and a "dark" reference sample 52 (i.e. with a low reflectance), efficient correction can be achieved in S12.

The reference spectrophotometer 35 may acquire the first reflectance output values V1 from the reference samples 52 only once, for instance shortly after completion of the assembly of the system 50 illustrated in FIG. 1. In a particular example, the processing device 38 obtains in S2 the first reflectance output values V1 acquired by the reference spectrophotometer 35 once and for all (one-time operation), for instance upon completion of the assembly of the system 50.

The spectrophotometer 2 may acquire the second reflectance output values V2 from the reference samples 52 on a regular basis (e.g. once a day), as part of maintenance to the system 50. In a particular example, the processing device 38 obtains (S4) periodically the second reflectance output values V2 acquired by the spectrophotometer 2, e.g. once a day. Each time a new set of second reflectance output values is obtained in S4, the processing device 38 may perform an interpolation S8, as described earlier with reference to FIG. 8.

In a particular example, the correction S12 as shown in FIG. 8 is applied each time the processing device 38 obtains (S10) a new reflectance output value acquired by the spectrophotometer from a sample of interest.

Obtaining the interpolation data (S8) frequently and correcting (S12) systematically the reflectance output measurements acquired by the spectrophotometer 2 allow more robust results to be achieved with respect to changes of the mechanical setup of the spectrophotometer 2 over time.

Among possible applications, the method and the corresponding processing device of the present disclosure may be used to monitor color on substrates, for instance to monitor color of ink printed by printers, such as inkjet printers, on medium substrates.

What is claimed is:

1. A method including:
   obtaining first reflectance output values acquired from at least two reference samples by a reference color measuring device over a wavelength range;
   obtaining second reflectance output values acquired from the at least two reference samples by a second color measuring device, different from the reference color measuring device, over the wavelength range;
   determining, for a plurality of wavelength values within said wavelength range, correspondences between a first reflectance output value acquired by the reference color measuring device and a second reflectance output value acquired by the second color measuring device;
   performing, for each wavelength value, an interpolation based on the correspondences to obtain interpolation data;
   obtaining third reflectance output values acquired from a sample of interest by the second color measuring device over the wavelength range; and correcting the third reflectance output values based on the interpolation data.

2. The method of claim 1, wherein the first reflectance output values include:
   a first set of first reflectance output values acquired from a first reference sample, said first set of second reflectance output values being above 70% reflectance over the range of wavelength values; and
   a second set of first reflectance output values acquired from a second reference sample, said second set of second reflectance output values being below 10% reflectance over the range of wavelength values.

3. The method of claim 1, wherein the interpolation data is representative, for each of said plurality of wavelength values, of correspondences between a reflectance output using the reference color measuring device and a reflectance output using the second color measuring device.

4. The method of claim 3, wherein the interpolation data includes a plurality of separate sets of interpolation data corresponding to each of said plurality of wavelength values.

5. The method of claim 1, wherein the interpolation is a linear interpolation or a spline interpolation.

6. The method of claim 1, including storing the interpolation data in a database.

7. The method of claim 1, wherein correcting the third reflectance output values based on the interpolation data includes:
   estimating, based on the interpolation data, an error induced by the second color measuring device while acquiring the third reflectance output values; and
   correcting the third reflectance output values to compensate for said error.

8. The method of claim 7, wherein the error is an aberration-induced error.

9. A method including:
   detecting first reflectance output values acquired from reference samples over a wavelength range using a first color measuring device;
   detecting, second reflectance output values acquired from the reference samples over the wavelength range using a second color measuring device;
   determining, for a plurality of wavelength values within said wavelength range, correspondences between a first reflectance output value acquired by the first color measuring device and a second reflectance output value acquired by the second color measuring device;
   performing, for each of said plurality of wavelength values, an interpolation of said determined correspondences, to obtain interpolation data representative of correspondences between a reflectance output using the first color measuring device and a reflectance output using the second color measuring device over the wavelength range;
   detecting, from a sample of interest, third reflectance output values over the wavelength range using the second color measuring device; and
   applying the interpolation data to the third reflectance output values to correct an error induced by the second color measuring device while acquiring the third reflectance output values.

10. A non-transitory recording medium readable by a computer and having recorded thereon a computer program including instructions for executing the method of claim 1.

11. A device including:
    a processor with an associated memory unit storing a computer program, wherein, when running the computer program, the processor implements an acquiring unit, a processing unit and a correcting unit;
    the acquiring unit to obtain first reflectance output values acquired from at least two reference samples by a reference color measuring device over a wavelength range, wherein the acquiring unit is to obtain second reflectance output values acquired from the at least two reference samples by a second color measuring device over the wavelength range, said second color measuring device being distinct from the reference color measuring device;
    the processing unit to determine, for a plurality of wavelength values within said wavelength range, correspondences between a first reflectance output value acquired by the reference color measuring device and a second reflectance output value acquired by the second color measuring device, and to perform, for each of said plurality of wavelength values, an interpolation based on the correspondences to obtain interpolation data, wherein the acquiring unit is to obtain third reflectance output values acquired from a sample of interest by the second color measuring device over the wavelength range; and
    the correcting unit to correct the third reflectance output values based on the interpolation data.

12. The device of claim 11, wherein the interpolation data is representative, for each of said plurality of wavelength values, of correspondences between a reflectance output using the reflectance color measuring device and a reflectance output using the second color measuring device.

13. A color measuring system including:
    a color measuring device according to claim 11;
    reference samples; and
    a positioning unit to position each reference sample in position for acquisition of reflectance output values by the color measuring device.

14. The device of claim 11, wherein: the reference color measuring device comprises a reference spectrophotometer; and
    the second color measuring device comprises a second spectrophotometer, the device further comprising a communication interface between the processor
    and the spectrophotometers.

15. The device of claim 11, wherein the reference color measuring device comprises a handheld device that can be positioned to measure the at least two reference samples.

16. The device of claim 11, wherein, for each reference sample, the processing unit is to determine an error between the first reflectance output values and the second reflectance output values.

17. The device of claim 16, wherein the error is expressed as a percentage.

18. The device of claim 11, wherein the interpolation is a linear or spline interpolation.

19. The device of claim 11, the device to independently, for each of a plurality of wavelength values, determine correspondence between the first and second reflectance output values.

* * * * *